United States Patent
Chang

(10) Patent No.: US 8,928,613 B2
(45) Date of Patent: Jan. 6, 2015

(54) TOUCH CONTROL SYSTEM FOR TOUCH PANEL

(71) Applicant: Chin Ten Chang, New Taipei Hsien (TW)

(72) Inventor: Chin Ten Chang, New Taipei Hsien (TW)

( * ) Notice: Subject to any disclaimer, the term of this patent is extended or adjusted under 35 U.S.C. 154(b) by 277 days.

(21) Appl. No.: 13/646,741

(22) Filed: Oct. 8, 2012

(65) Prior Publication Data

US 2014/0098029 A1   Apr. 10, 2014

(51) Int. Cl.
*G06F 3/041* (2006.01)

(52) U.S. Cl.
USPC .......................................................... 345/173

(58) Field of Classification Search
None
See application file for complete search history.

(56) References Cited

U.S. PATENT DOCUMENTS

| 8,682,104 B2 * | 3/2014 | Sugiyama et al. ............. 382/284 |
| 2013/0155100 A1 * | 6/2013 | Sang et al. .................... 345/619 |
| 2013/0265322 A1 * | 10/2013 | Tsujimoto et al. ............. 345/589 |

* cited by examiner

*Primary Examiner* — Joseph Feild
*Assistant Examiner* — Parul Gupta

(57) ABSTRACT

A touch control system for a touch panel includes a touch panel receiving pressures or electric signals on a surface thereof; a touch track for an image on a display screen being defined; a logic unit generating different actions corresponding to the touch tracks so that an image on a screen changes based on the actions from the logic unit; an image processor receiving instructions about the actions from the logic unit so that the image on the display screen will act based on the instructions; and wherein the logic unit divides an image on the display screen into an image moving area and an image size change area when an initial point of the touch track is at the image moving area, the image moves. When the initial point of the touch track is at the image size change area, the size of the image is changed.

21 Claims, 2 Drawing Sheets

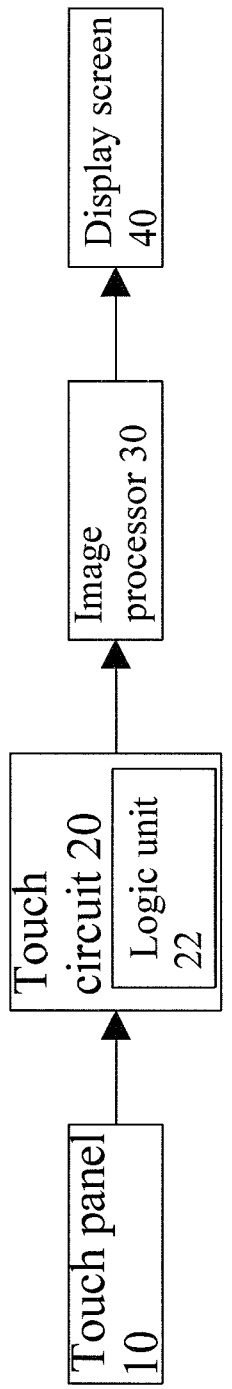
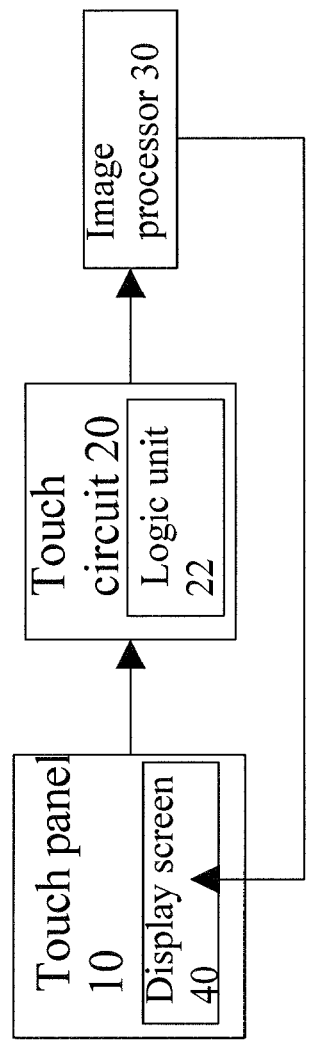

TOUCH CONTROL SYSTEM FOR TOUCH PANEL

FIELD OF THE INVENTION

The present invention relates to operations of touch panels, and in particular to a touch control system for a touch panel.

BACKGROUND OF THE INVENTION

Currently, due to wide use of touch panels, many operations about the electronic devices having displays are defined by inputting to the touch panels. The touching tracks on the display screens cause the images on the display screen to be changed to suit for viewing, looking or generating specific operation of users.

However, in use of the touch panel, it is often that undesired operations generates due to the mistake from the users. Currently, the touch sensing area covers the whole screen of the touch panel, and thus undesired touch to the panel will cause misadjust to the images on the display screen. Therefore, it is necessary to have a precise definition to cause the touch track to be defined only on predetermined area so as to reduce the undesired fault operations to affect the user's viewing, looking or operations. Furthermore, by the present invention, the software operation keys or buttons on the screen of the display can be reduced so as to reduce the undesired image icons on the screen.

SUMMARY OF THE INVENTION

The object of the present invention is to improve the defects in the prior art, the present invention discloses a touch control system for a touch panel which can change the defects in the prior art about the operation of clicking a touch panel, that is the touch panel misadjusts the input tracks due to error contacts to the display screen. Since in the present invention, the touch panel is divided into two parts, the error contact is not easy to occur. Furthermore, definitions form various touch tracks according to present invention causes that the image on a smart phone, tablet computer or notebook computer can be adjusted to a desired one for looking, viewing and operation with very few errors.

To achieve above object, the present invention provides a touch control system for a touch panel comprises a touch panel receiving pressures or electric signals on a surface of the touch panel; a touch track for an image on a display screen being defined as a track along a moving path of the pressure or electric signals applied to the display screen and an initial point of the moving path being within the image; a touch circuit connected to the touch panel for receiving the touch tracks from the touch panel; the touch circuit including a logic unit which generates different actions corresponding to the touch tracks so that an image on a display screen changes based on the actions from the logic unit; an image processor receiving instructions about the actions from the logic unit of the touch circuit so that the image on the display screen will act based on the instructions; and wherein the logic unit divides an image on the display screen into an image moving area and an image size change area; when an initial point of the touch track is at the image moving area; the logic unit generates an instruction for moving the image; and the instruction is transferred to the image processor for moving the image; and when the initial point of the touch track is at the image size change area the logic unit generates an instruction for changing size of the image; as a vector of the touch track is from an outer area of the image on the display screen to an inner area of the display screen, the image will be reduced; and when the vector of the touch track is from the inner area of the display screen to an outer area of the display screen, the image will be enlarged.

BRIEF DESCRIPTION OF THE DRAWINGS

FIG. 1 shows a structural block diagram of the present invention.

FIG. 2 shows another structural block diagram of the present invention.

DETAILED DESCRIPTION OF THE IVENTION

Figure 3:
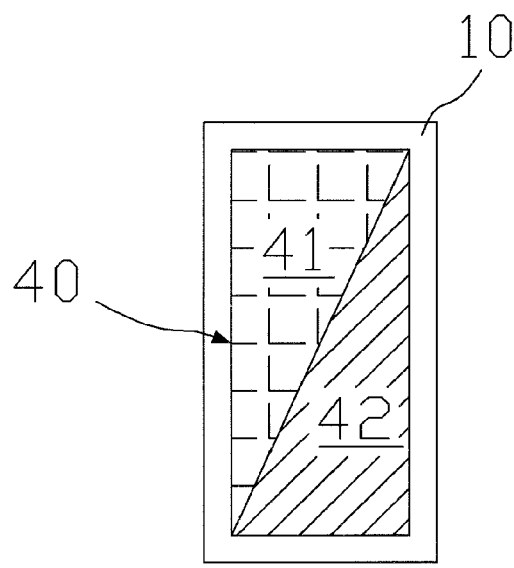
FIG. 3 shows the distribution of the image according to the present invention.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

With reference to FIG. 1, the touch control system for a touch panel of the present invention is illustrated. The present invention includes the following elements.

A touch panel 10 receives pressures or electric signals on a surface of the touch panel 10. A touch track for an image on a display screen is defined as a track along a moving path of the pressure or electric signals applied to the display screen 40 and an initial point of the moving path is within the image. The touch panel 10 is a resistive touch panel, a capacitive touch panel, or other forms. Also the touch panel 10 is a transparent or non-transparent touch panel. Preferably, the touch panel 10 is a transparent touch panel.

A touch circuit 20 is connected to the touch panel 10 for receiving the touch tracks from the touch panel 10.

The touch circuit 20 includes a logic unit 22. The logic unit 22 generates different actions corresponding to the touch tracks so that the image on a display screen 40 changes based on the actions from the logic unit 22.

With reference to FIG. 2, in the present invention, it is illustrated that the touch panel 10 is installed above the display screen 40 (such as a display screen of a smart phone or a tablet computer) or separates from the display screen 40 (such as a touch panel of a notebook computer, etc.).

An image processor 30 receives instructions about the actions from the logic unit 22 of the touch circuit 20 so that the image on the display screen 40 will act based on the instructions.

In the present invention, the logic unit 22 is divided into two areas, as illustrated in FIG. 3, one is an image moving area 41 and the other is an image size change area 42. When the touch track is near a straight line and is on the image moving area 41, the logic unit 22 generates an instruction for moving the image to cause that the image moves along vector the touch track. The instruction is transferred to the image processor 30 to control the image on the display screen 40 to move along the touch track.

When the touch track is almost a line vector and is on the image size change area 42, the image will be enlarged or reduced. When a vector of the touch track is from an outer area of the image on the display screen 40 (near the frame of the display screen 40) to an inner area of the display screen 40 (near a center of the display screen 40), the image will be reduced. Contrarily, when the vector of the touch track is from the inner area of the display screen 40 to an outer area of the display screen 40, the image will be enlarged.

If the touch track is initially on the image size change area 42, the image will moves along the touch track.

Figure 4:
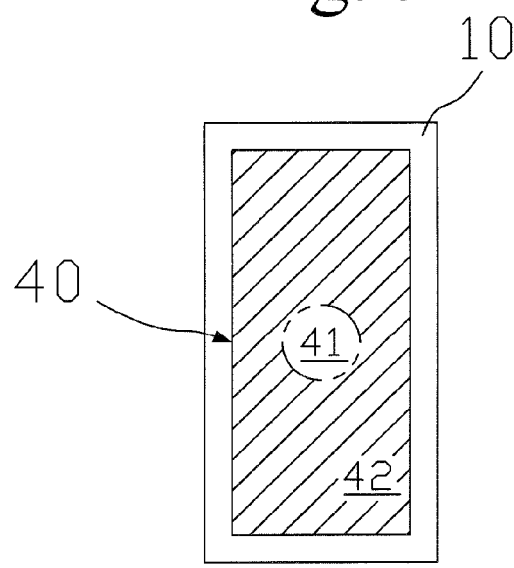
FIG. 4 shows another distribution of the image according to the present invention.

With reference to FIG. 4, in one application, the image moving area 41 is defined as an area near and enclosing a center of the image. Other portion out of the image moving area 41 is the image size change area 42.

The present invention provides variant embodiments based on the tough tracks.

Single Track Operation

A single track operation is defined as the touch track is a single track so that when the touch circuit 20 receives the signals of the touch track, the logic unit 22 generates corresponding instructions. The uses of this operation will be described herein.

In the image enlarging operation, the touch circuit 20 receives the point touch track (for example, a finger clicks one point on the display screen 40), if the image on the display screen 40 is a pure image (not including any table and having no connection to other web pages or operations), the logic unit 22 will generate an instruction to restore the image to an initial displayed size on the display screen 40. Then the instruction is transferred to the image processor 30 so that the image on the display screen 40 is restored on the original size.

Figure 5:
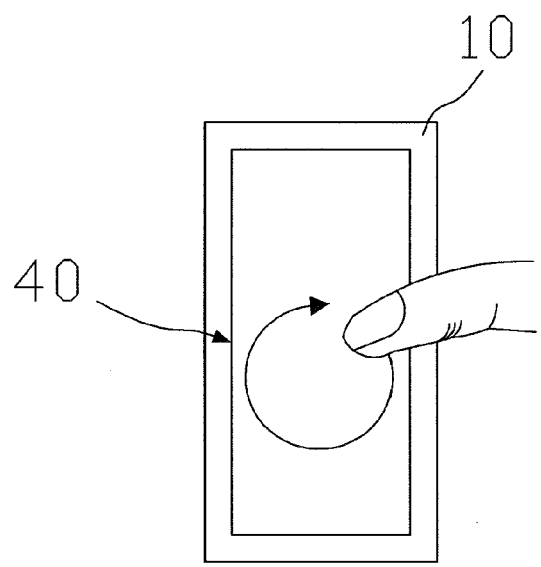
FIG. 5 is a schematic view about one touch track of the present invention.

With reference to FIG. 5, when the touch track is a round or arc track, the logic unit 22 will generate an instruction to rotate the image according to the round or arc track. The instruction is then transferred to the image processor 30 to instruct the image rotates around a center of the track based on the round or act track.

A double touch track operation means that there are two touch tracks generated in one operation so that the touch circuit 20 receives two tracks one time.

Double Touch Track Operation

The application about double touch track operation is described herein.

Figure 6:
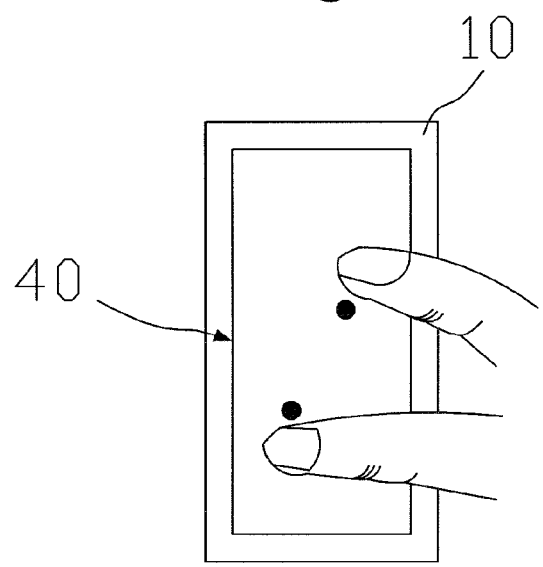
FIG. 6 is a schematic view about another touch track of the present invention.

With reference to FIG. 6, when the touch tracks are two points clicking on the image (for example, two fingers click the touch panel 10 at the same time), the logic unit 22 will generate an image size expansion instruction which is transferred to the image processor 30 so that the image processor 30 will expand the image until the two points on the image contacts the frame of the display screen 40. At this time, the operation enters into a change operation.

When the touch circuit 20 receive a point track and a line track which are initiated at the same time (for example, initially, two fingers contact the image, and then one finger leaves from the image). When the line track is near a straight line track, the logic unit 22 and the image processor 30 will cause the size of the image to reduce as the line track points to a center of the image or the size of the image to enlarge as the line track points to an edge of the image. When the line track is near a curved track, the logic unit 22 and the image processor 30 will cause the image to rotate along the curved track.

If the touch circuit 20 receives two point tracks twice (i. e., two fingers click on the images at the same time and then further clicks again). The logic unit 22 will display the image by a pixel to pixel way, that is: each pixel of the image is displayed on the display screen 40 by using a pixel corresponding thereto, thus the resolution of the displayed image identical to the image file stored in the memory (for example, if an image file is stored by 1024×512 pixels, then it also displayed on the display screen 40 by an area of 1024×512 pixels, each pixel on the display screen 40 is corresponding to one pixel in the image file). Then the operation enters into a size change mode. Under this mode, when the touch circuit 20 receives two point tracks twice, the displayed image will be restored to the original displayed image. Then the operation is out of the image size change mode.

The object of the present invention is to change the defect in the prior art about the operation of clicking a touch panel, that is: the touch panel misadjusts the input tracks due to error contacts to the display screen. Since in the present invention, the touch panel is divided into two areas, the error contact is not easy to occur. Furthermore, above definitions form various touch tracks causes that the image on a smart phone, tablet computer or notebook computer can be adjusted to a desired one for looking, viewing and operation with very few errors.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A touch control system for a touch panel, comprising:
a touch panel receiving pressures or electric signals on a surface of the touch panel; a touch track for an image on a display screen being defined as a track along a moving path of the pressure or electric signals applied to the display screen and an initial point of the moving path being within the image;
a touch circuit connected to the touch panel for receiving the touch tracks from the touch panel; the touch circuit including:
a logic unit generating different instructions corresponding to the touch tracks so that the image on a display screen changes based on the instructions from the logic unit;
an image processor receiving instructions from the logic unit of the touch circuit so that the image on the display screen will act based on the instructions; and
wherein the logic unit divides the image on the display screen into an image moving area and an image size change area when the initial point of the touch track is at the image moving area; the logic unit generates an instruction for moving the image; and the instruction is transferred to the image processor for moving the image; and
when the initial point of the touch track is at the image size change area; the logic unit generates an instruction for changing a size of the image; as a vector of the touch track is from an outer area of the image on the display screen to an inner area of the display screen, the image will be reduced; and when the vector of the touch track is from the inner area of the display screen to an outer area of the display screen, the image will be enlarged.

2. The touch control system for a touch panel as claimed in claim 1, wherein the image moving area is defined as an area near and enclosing a center of the image; and other portion out of the image moving area is the image size change area.

3. The touch control system for a touch panel as claimed in claim 1, wherein a single track operation is defined as the touch track is a single track so that when the touch circuit receives the signals of the touch tracks, the logic unit generates corresponding instructions.

4. The touch control system for a touch panel as claimed in claim 1, wherein when the touch tracks are two points clicking on the image, the logic unit generate an image size expansion instruction which is transferred to the image processor so that the image processor will expand the image until the two points on the image contacts the frame of the display screen.

5. The touch control system for a touch panel as claimed in claim 1, wherein if the touch circuit receives two point tracks twice, the logic unit will display the image by a pixel to pixel way, that is: each pixel of the image is displayed on the display screen by using a pixel on the display screen.

6. The as claimed in claim 4, wherein after expansion, when a further touch track formed by an outward moving from an inner area of the image, the logic unit generates an image size expansion instruction for further expansion the image; and when a further touch track formed by an inward moving from an outer area image, the logic unit generates an image size reduction instruction for reducing the image.

7. The as claimed in claim 5, wherein after display the image by a pixel to pixel way, when a further touch track formed by an outward moving from an inner area of the image, the logic unit generates an image size expansion instruction for further expansion the image; and when a further touch track formed by an inward moving from an outer area of the image, the logic unit generates an image size reduction instruction for reducing the image.

8. The touch control system for a touch panel as claimed in claim 1, wherein when the touch circuit receive a point track and a line track which are initiated at the same time, if the line track is near a straight line track, the logic unit and the image processor will cause the image size to reduce as the line track points to a center of the image or to enlarge as the line track points to an edge of the image.

9. The touch control system for a touch panel as claimed in claim 1, wherein when the touch circuit receives a point track and a line track which are initiated at the same time, if the line track is near a curved track, the logic unit and the image processor will cause the image to rotate along the curved track.

10. The touch control system for a touch panel as claimed in claim 4, wherein after expansion, when a further touch track is formed and is a round or arc track, the logic unit will generate an instruction to rotate the image according to the round or arc track so that the image moves along the round or arc track.

11. The touch control system for a touch panel as claimed in claim 5, wherein after display the image by a pixel to pixel way, when a further touch track is formed and is a round or arc track, the logic unit will generate an instruction to rotate the image according to the round or arc track so that the image moves along the round or arc track.

12. The touch control system for a touch panel as claimed in claim 8, wherein after expansion or reduction of the image, when a further touch track is formed and is a round or arc track, the logic unit will generate an instruction to rotate the image according to the round or arc track so that the image moves along the round or arc track.

13. The touch control system for a touch panel as claimed in claim 4, wherein after expansion, when a further touch track is formed and is a point touch track, if the image on the display screen does not include tables or has no connection instruction therein, the logic unit will generate an instruction to restore the image to an initial displayed size.

14. The touch control system for a touch panel as claimed in claim 5, wherein after display the image by a pixel to pixel way, when a further touch track is formed and is a point touch track, if the image on the display screen does not include tables or has no connection instruction therein, the logic unit will generate an instruction to restore the image to an initial displayed size.

15. The touch control system for a touch panel as claimed in claim 8, wherein after expansion or reduction of the image, when a further touch track is formed and is a point touch track, if the image on the display screen does not include tables or has no connection instruction therein, the logic unit will generate an instruction to restore the image to an initial displayed size.

16. The touch control system for a touch panel as claimed in claim 4, wherein after expansion, when further two points touch track are received twice, the logic unit will generate an instruction to restore the image to an initial displayed size.

17. The touch control system for a touch panel as claimed in claim 5, wherein after display the image by a pixel to pixel way, when further two points touch track are received twice, the logic unit will instruction to restore the image to an initial displayed size.

18. The touch control system for a touch panel as claimed in claim 8, wherein after expansion or reduction of the image, when further two points touch track are received twice, the logic unit will generate an instruction to restore the image to an initial displayed size.

19. The touch control system for a touch panel as claimed in claim 1, wherein the touch panel is one of a resistive touch panel and a capacitive touch panel.

20. The touch control system for a touch panel as claimed in claim 1, wherein the touch panel is a transparent touch panel or a non-transparent touch panel.

21. The touch control system for a touch panel as claimed in claim 1, wherein the touch panel is installed on a display screen or separates from display screen.

* * * * *